United States Patent
Wilson et al.

(10) Patent No.: US 9,557,439 B2
(45) Date of Patent: Jan. 31, 2017

(54) OPTICAL ELECTRIC FIELD SENSORS HAVING PASSIVATED ELECTRODES

(71) Applicant: Halliburton Energy Services, Inc., Houston, TX (US)

(72) Inventors: Glenn Andrew Wilson, Houston, TX (US); Burkay Donderici, Houston, TX (US); Etienne M. Samson, Cypress, TX (US); Tasneem A. Mandviwala, Katy, TX (US); Ahmed Fouda, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 153 days.

(21) Appl. No.: 14/422,464

(22) PCT Filed: Feb. 28, 2014

(86) PCT No.: PCT/US2014/019228
§ 371 (c)(1),
(2) Date: Feb. 19, 2015

(87) PCT Pub. No.: WO2015/130298
PCT Pub. Date: Sep. 3, 2015

(65) Prior Publication Data
US 2016/0259085 A1 Sep. 8, 2016

(51) Int. Cl.
*E21B 47/01* (2012.01)
*G01V 11/00* (2006.01)
(Continued)

(52) U.S. Cl.
CPC .............. *G01V 11/002* (2013.01); *E21B 33/14* (2013.01); *E21B 47/10* (2013.01); *E21B 47/123* (2013.01); *G01V 3/30* (2013.01)

(58) Field of Classification Search
CPC ...... E21B 47/01; E21B 17/206; E21B 47/123; E21B 47/12; G01V 1/40
See application file for complete search history.

(56) References Cited

U.S. PATENT DOCUMENTS 4,090,141 A  5/1978  LeBlanc
4,348,587 A  9/1982  Tangonan et al.
(Continued)

FOREIGN PATENT DOCUMENTS

EP  0212915 A2  3/1987
EP  0856753 A1  5/1998
(Continued)

OTHER PUBLICATIONS

"Automated identification of changes in electrode contact properties for long-term permanent ERT monitoring experients", J. Deceuster, O. Kaufmann, and V. Camp, 2013, Automated identification of changes in electrode contact properties for long-term permanent ERT monitoring experients: Geophysics, vol. 78 (2), E79-E94, 16 pgs.

(Continued)

*Primary Examiner* — Zakiya W Bates
(74) *Attorney, Agent, or Firm* — Iselin Law PLLC; Benjamin Fite

(57) ABSTRACT

Permanent electromagnetic (EM) monitoring of the regions around and between wells may employ a casing string positioned within a borehole through the subsurface formations of interest. At least two passivated electrodes are mounted on the casing string to sense electric fields in the formation. Though only capacitively coupled to the formation, the passivated electrodes nevertheless provide a potential difference to an electro-optical transducer, which in turn modifies a property of the light passing along an optical fiber attached to the casing string. An interface unit senses the modified property to derive a measure of the electric field (Continued)

between each pair of passivated electrodes. The passivated electrodes have a contact surface that is conductive but for one or more layers of non-reactive (and thus electrically insulating) materials. Illustrative materials include metal oxides, polymers and ceramics, but the layers are preferably kept very thin to maximize the coupling capacitance with the formation.

16 Claims, 3 Drawing Sheets

(51) Int. Cl.
*E21B 47/12* (2012.01)
*E21B 33/14* (2006.01)
*E21B 47/10* (2012.01)
*G01V 3/30* (2006.01)

(56) References Cited

U.S. PATENT DOCUMENTS

| | | | |
|---|---|---|---|
| 4,360,272 | A | 11/1982 | Schmadel et al. |
| 4,376,248 | A | 3/1983 | Giallorenzi et al. |
| 4,433,291 | A | 2/1984 | Yariv et al. |
| 4,622,460 | A | 11/1986 | Failes et al. |
| 4,868,495 | A | 9/1989 | Einzig et al. |
| 4,950,883 | A | 8/1990 | Glenn et al. |
| 4,996,419 | A | 2/1991 | Morey et al. |
| 5,317,576 | A | 5/1994 | Leonberger et al. |
| 5,471,139 | A | 11/1995 | Zadoff |
| 5,511,083 | A | 4/1996 | D'Amato |
| 5,513,913 | A | 5/1996 | Ball et al. |
| 5,642,051 | A | 6/1997 | Babour et al. |
| 5,691,999 | A | 11/1997 | Ball et al. |
| 5,754,284 | A | 5/1998 | LeBlanc et al. |
| 5,844,927 | A | 12/1998 | Kringlebotn |
| 6,188,712 | B1 | 2/2001 | Jiang et al. |
| 6,271,766 | B1 | 8/2001 | Didden et al. |
| 6,289,740 | B1 | 9/2001 | Posey et al. |
| 6,294,917 | B1 | 9/2001 | Nichols |
| 6,314,056 | B1 | 11/2001 | Bunn et al. |
| 6,332,109 | B1 | 12/2001 | Sheard et al. |
| 6,463,186 | B1 | 10/2002 | Li |
| 6,534,986 | B2 | 3/2003 | Nichols |
| 6,724,469 | B2 | 4/2004 | LeBlanc |
| 6,731,114 | B1 | 5/2004 | Lagabrielle et al. |
| 6,747,743 | B2 | 6/2004 | LeBlanc |
| 6,809,516 | B1 | 10/2004 | Li et al. |
| 6,914,433 | B2 | 7/2005 | Wright et al. |
| 6,957,576 | B2 | 10/2005 | Skinner et al. |
| 6,961,601 | B2 | 11/2005 | Matthews et al. |
| 7,109,717 | B2 | 9/2006 | Constable |
| 7,151,377 | B2 | 12/2006 | Chouzenoux et al. |
| 7,183,777 | B2 | 2/2007 | Bristow et al. |
| 7,477,160 | B2 | 1/2009 | Lemenager et al. |
| 7,492,168 | B2 | 2/2009 | Ogilvy et al. |
| 7,673,682 | B2 | 3/2010 | Daily |
| 8,035,393 | B2 | 10/2011 | Tenghamn et al. |
| 8,058,869 | B2 | 11/2011 | Cranch et al. |
| 8,380,439 | B2 | 2/2013 | Lagmanson et al. |
| 8,437,961 | B2 | 5/2013 | Srnka et al. |
| 8,710,845 | B2 | 4/2014 | Lindqvist et al. |
| 2001/0023614 | A1 | 9/2001 | Tubel et al. |
| 2002/0063866 | A1 | 5/2002 | Kersey et al. |
| 2003/0038634 | A1 | 2/2003 | Strack |
| 2003/0057950 | A1 | 3/2003 | Gao et al. |
| 2004/0093950 | A1 | 5/2004 | Bohnert |
| 2006/0250274 | A1 | 11/2006 | Mombourquette et al. |
| 2006/0272809 | A1 | 12/2006 | Tubel et al. |
| 2008/0042636 | A1 | 2/2008 | Koste et al. |
| 2008/0210426 | A1 | 9/2008 | Lembcke et al. |
| 2008/0241964 | A1 | 10/2008 | Kaieda et al. |
| 2008/0246485 | A1 | 10/2008 | Hibbs et al. |
| 2009/0188665 | A1 | 7/2009 | Tubel et al. |
| 2009/0199630 | A1 | 8/2009 | Difoggio et al. |
| 2009/0237084 | A1 | 9/2009 | Itskovich et al. |
| 2010/0134113 | A1 | 6/2010 | Depavia et al. |
| 2010/0271030 | A1 | 10/2010 | Reiderman et al. |
| 2011/0017512 | A1 | 1/2011 | Cidazzu |
| 2011/0074428 | A1 | 3/2011 | Wang |
| 2011/0083838 | A1 | 4/2011 | LaBrecque |
| 2011/0084696 | A1 | 4/2011 | Tenghamn et al. |
| 2011/0090496 | A1 | 4/2011 | Samson et al. |
| 2011/0100632 | A1 | 5/2011 | Dinariev et al. |
| 2011/0170112 | A1 | 7/2011 | LeBlanc |
| 2011/0198078 | A1 | 8/2011 | Harrigan et al. |
| 2011/0277996 | A1 | 11/2011 | Cullick et al. |
| 2012/0001625 | A1 | 1/2012 | Yamada et al. |
| 2012/0013893 | A1 | 1/2012 | Maida et al. |
| 2012/0061084 | A1 | 3/2012 | Sweatman et al. |
| 2012/0147381 | A1 | 6/2012 | LeBlanc et al. |
| 2012/0147924 | A1 | 6/2012 | Hall |
| 2012/0175513 | A1 | 7/2012 | Duncan et al. |
| 2012/0223717 | A1 | 9/2012 | LaBrecque |
| 2012/0234605 | A1 | 9/2012 | Donderici et al. |
| 2012/0293179 | A1 | 11/2012 | Colombo et al. |
| 2013/0141102 | A1 | 6/2013 | Donderici et al. |
| 2013/0166215 | A1 | 6/2013 | Bittar et al. |
| 2013/0169278 | A1 | 7/2013 | Bittar et al. |
| 2013/0248250 | A1 | 9/2013 | Bittar et al. |
| 2013/0297215 | A1 | 11/2013 | Rondeleux |
| 2014/0036628 | A1 | 2/2014 | Hill et al. |
| 2014/0222343 | A1* | 8/2014 | Samson .................. G01V 3/12 702/8 |
| 2015/0137817 | A1* | 5/2015 | Wilson .................. E21B 43/10 324/333 |

FOREIGN PATENT DOCUMENTS

| | | |
|---|---|---|
| GB | 2433112 A | 6/2007 |
| GB | 2433112 B | 7/2008 |
| GB | 2452609 A | 3/2009 |
| JP | 2011069700 | 7/2011 |
| WO | WO-2005/085909 | 9/2005 |
| WO | WO-2012005737 | 1/2012 |
| WO | WO-2012/061844 | 5/2012 |
| WO | WO-2012/075474 | 6/2012 |
| WO | WO-2012/100217 | 7/2012 |
| WO | WO-2012/145583 | 10/2012 |
| WO | WO-2012/177349 | 12/2012 |
| WO | WO-2014/120305 | 8/2014 |

OTHER PUBLICATIONS

"Crosswell electromagnetic tomography: System design considerations and field results", M. J. Wilt, D. L. Alumbaugh, H. F. Morrison, A. Becker, K. H. Lee, and M. Deszez-Pan, 1995, Crosswell electromagnetic tomography: System design considerations and field results: Geophysics, 60 (3), 871-885, 15 pgs.
"International Search Report & Written Opinion", Dated Jan. 10, 2014, Appl No. PCT/US2013/064122, filed Oct. 9, 2013, 10 pgs.
"PCT Application as Filed", Appl No. PCT/US2014/067774, "Offshore Electromagnetic Reservoir Monitoring," Filed Nov. 26, 2014, 27 pgs.
"PCT Application as Filed", Appl No. PCT/US2014/067777, "Onshore Electromagnetic Reservoir Monitoring," Filed Nov. 26, 2014, 27 pgs.
"PCT Application as Filed", PCT/US2014/038552, "Optical Magnetic Field Sensor Units for a Downhole Environment," Filed May 19, 2014, 24 pgs.
"PCT International Search Report and Written Opinion", Dated Nov. 5, 2014, Appl No. PCT/US2014/019228, "Optical Electric Field Sensors Having Passivated Electrodes ," Filed Feb. 28, 2014, 14 pgs.
"PCT Written Opinion", Dated Feb. 17, 2014, Appl No. PCT/US2013/067285, "Fiberoptic Systems and Methods for Formation Monitoring," Filed Nov. 29, 2013, 14 pgs.
"Reservoir monitoring in oil sands: Developing a permanent crosswell system", R. Tøndel, J. Ingham, D. LaBrecque, H. Schütt, D.

(56) References Cited

OTHER PUBLICATIONS

McCormick, R. Godfrey, J. A. Rivero, S. Dingwall, and A. Williams, 2011, Reservoir monitoring in oil sands: Developing a permanent cross-well system: Presented at SEG Annual Meeting, San Antonio, 5 pgs.
"Surface-downhole electrical resistivity tomography applied to monitoring of CO2 storage at Ketzin, Germany", P. Bergmann, C. Schmidt-Hattenberger, D. Kiessling, C. Rucker, T. Labitzke, J. Henninges, G. Baumann, and H. Schutt, 2012, Surface-downhole electrical resistivity tomography applied to monitoring of CO2 storage at Ketzin, Germany: Geophysics, vol. 77 (6), 15 pgs.
"UK Examination Report", dated Feb. 5, 2014, Appl No. 1315987. 6, "Fiberoptic Systems and Methods Detecting EM Signals Via Resistive Heating", filed Sep. 9, 2013, 6 pgs.
"US Non-Final Office Action", Dated Oct. 31, 2014, U.S. Appl. No. 13/736,324, "Fiberoptic Systems and Methods for Formation Monitoring," filed Jan. 8, 2013, 12 pgs.
"US Non-Final Office Action", Dated Aug. 14, 2014, U.S. Appl. No. 13/648,897, "Fiberoptic Systems and Methods Detecting EM Signals Via Resistive Heating," filed Oct. 10, 2012, 22 pgs.
Andréis, David et al., "Using CSEM to Monitor Production From a Complex 3D Gas Reservoir—A Synthetic Case Study", The Leading Edge, 30 (11), (2011), pp. 1070-1079.
Ball, G.A., et al., "Single- and Multipoint Fiber-Laser Sensors", IEEE Photonics Technology Letters, vol. 5, No. 2, (Feb. 1993), 4 pgs.
Bergmann, Peter et al., "Surface-Downhole Electrical Resistivity Tomography Applied to Monitoring of CO2 Storage at Ketzin, Germany", Geophysics, vol. 77, No. 6, Nov.-Dec. 2012, pp. B253-B267.
Berre, Inga et al., "Identification of three-dimensional electric conductivity changes from time-lapse electromagnetic observations", Journal of Computational Physics, 230, (2011), pp. 3915-3928.
Bhatia, Vikram et al., "Optical Fiber Long-Period Grating Sensors", Optics Letter, vol. 21, No. 9, (May 1, 1996), 3 pgs.
Bhuyian, Anwar H. et al., "3D CSEM modeling and time-lapse sensitivity analysis for subsurface CO2 storage", Geophysics 77 (5), (2012), pp. E343-E355.
Black, Noel et al., "3D inversion of time-lapse CSEM data based on dynamic reservoir simulations of the Harding field, North Sea", 2011 SEG San Antonio 2011 Annual Meeting, (2011), pp. 2417-2421.
Black, Noel et al., "Monitoring of hydrocarbon reservoirs using marine CSEM method", SEG Houston 2009 International Exposition and Annual Meeting, (2009), 5 pgs.
Bristow, Q. et al., "A New Temperature, Capacitive-Resistivity, and Magnetic-Susceptibility Borehole Probe for Mineral Exploration, Groundwater, and Environmental Applications", Geological Survey of Canada, Technical Note No. 3, doi: 10.4095/289197, (2011), 13 pgs.
Carrigan, Charles R. et al., "Electrical resistance tomographic monitoring of CO2 movement in deep geologic reservoirs", International Journal of Greenhouse Gas Control, doi: 10.1016/j.ijggc. 2013.04.016, (2013), pp. 401-408.
Chuprin, Andrei et al., "Quantifying factors affecting repeatability in CSEM surveying for reservoir appraisal and monitoring", SEG Las Vegas 2008 Annual Meeting, (2008), pp. 648-652.
Colombo, Daniele et al., "Quantifying Surface-To-Reservoir Electromagnetics for Waterflood Monitoring in a Saudi Arabian Carbonate Reservoir", Geophysics, 78(6) E281-E297, (2013).
Donderici, Burkay, "Compensated Cross-Well Tomography Methods and Systems", Donderici, Burkay, "Compensated Cross-Well Tomography Methods and Systems", PCT Appl No. PCT/US2011/055020, filed Oct. 6, 2011, (Oct. 6, 2011),19 pgs.
Donderici, Burkay et al., "Fiberoptic Systems and Methods for Formation Monitoring", U.S. Appl. No. 13/736,324, filed Jan. 8, 2013, 21 pgs.

Douma, Marten et al., "A Capacitive-Coupled Ground Resistivity System for Engineering and Environmental Applications: Results of Two Canadian Field Tests", SEG Annual Meeting, Expanded Abstracts, (1994), pp. 559-561.
Hibbs, A D., et al., "Advances in Electromagnetic Survey Instrumentation and the Use of a Cased Borehole for Imaging a Deep Formations", 76th EAGE Conference & Exhibition 2014 Amsterdam RAI, The Netherlands, Jun. 16-19, 2014, (2014), 3 pgs.
Hibbs, A. D. et al., "Capacitive Electric Field Measurements for Geophysics", EAGE Conference and Exhibition incorporating SPE EUROPEC 2011, Vienna, Austria, Expanded Abstracts, (2011), 2 pgs.
Hibbs, Andrew et al., "New Electromagnetic Sensors for Magnetotelluric and Induced Polarization Geophysical Surveys", SEG Annual Meeting, Expanded Abstracts, (2012), 5 pgs.
Holten, T et al., "Time lapse CSEM measurements for reservoir monitoring using a vertical receiver-transmitter setup", 2011 SEG San Antonio 2011 Annual Meeting, (2011), pp. 697-701.
Hordt, A et al., "A First Attempt at Monitoring Underground Gas Storage by Means of Time-lapse Multichannel Transient Electromagnetics", Geophysical Prospecting, 2000, 48, 489-509, European Association of Geoscientists & Engineers, (2000), 21 pgs.
Jaaskelainen, Mikko, et al., "Optical Push-Pull Interferometric Sensors for Electromagnetic Sensing", U.S. Appl. No. 13/679,940, filed Nov. 16, 2012, 34 pgs.
Kang, Seogi et al., "A Feasibility Study of CO2 Sequestration Monitoring Using the MCSEM Method at a Deep Brine Aquifer in a Shallow Sea", Geophysics 77 (2), (2012), pp. E117-E126.
Kiessling, Dana et al., "Geoelectrical Methods for Monitoring Geological CO2 Storage: First Results From Cross-Hole and Surface-Downhole Measurements From the CO2Sink Test Site at Ketzin (Germany)", International Journal of Greenhouse Gas Control, 4, (2010), pp. 816-826.
Kuras, Oliver et al., "Capacitive Resistivity Imaging With Towed Arrays", Journal of Engineering and Environmental Geophysics, vol. 12, Issue 3, (2007), pp. 267-279.
Kuras, Oliver et al., "Fundamentals of the Capacitive Resistivity Technique", Geophysics, vol. 71, No. 3 (May-Jun. 2006), (2006), pp. G135-G152.
Labrecque, Douglas et al., "Assessment of Measurement Errors for Galvanic-Resistivity Electrodes of Different Composition", Geophysics, vol. 73, No. 2 (Mar.-Apr. 2008), (2008), pp. F55-F64.
Leblanc, Michel J., et al., "Fiberoptic Systems and Methods Detecting EM Signals Via Resistive Heating", U.S. Appl. No. 13/648,897, filed Oct. 10, 2012, 18 pgs.
Liang, Lin et al., "Joint Inversion of Controlled-Source Electromagnetic and Production Data for Reservoir Monitoring", Geophysics 77 (5), (2012), pp. ID9-ID22.
Lien, Martha et al., "Sensitivity Study of Marine CSEM Data for Reservoir Production Monitoring", Geophysics, 73 (4), (2008), pp. F151-F163.
Maas, Steve et al., "A Fibre Optic Multi-Component Seismic Acquisition System for Permanent Reservoir Monitoring", Presented at 2008 SPE Asia Pacific Oil and Gas Conference, SPE 115185, (2008), 7 pgs.
MacNae, James "Electric Field Measurements in Air", SEG Annual Meeting, Expanded Abstracts, (2010), pp. 1773-1777.
MacNae, James et al., "Near-Surface Resistivity Contast Mapping With a Capacitive Sensor Array and an Inductive Source", Geophysics, vol. 76, No. 2, (Mar.-Apr. 2011), (2011), pp. G13-G23.
Maida, John L., et al., "Downhole Species Selective Optical Fiber Sensor Systems and Methods", U.S. Appl. No. 13/253,788, filed Oct. 5, 2011, 23 pgs.
Mandviwala, Tasneem A., "Well Monitoring with Optical Electromagnetic Sensors", U.S. Appl. No. 13/679,926, filed Nov. 16, 2012, 28 pgs.
Marsala, Alberto F. et al., "First Borehole to Surface Electromagnetic Survey in KSA: Reservoir Mapping and Monitoring at a New Scale", SPE 146348, (2011), 9 pgs.
Marsala, Alberto F. et al., "Fluid Distribution Inter-Well Mapping in Multiple Reservoirs by Innovative Borehole to Surface Electromagnetic: Survey Design and Field Acquisition", IPTC 17045, (2013), 4 pgs.

(56) References Cited

OTHER PUBLICATIONS

Marsala, Alberto F. et al., "Six-Component Tensor of the Surface Electromagnetic Field Produced by a Borehole Source Recorded by Innovative Capacitive Sensors", Presented at SEG 83rd Annual Meeting, (2013), 5 pgs.

Mwenifumbo, C. J. et al., "Field Evaluation of a New Borehole Resistivity Probe Using Capacitive Electrodes", Proceedings of the Symposium on the Applications of Geophysics to Engineering and Environmental Problems, (1999), pp. 859-867.

Mwenifumbo, C. Jonathan et al., "Capacitive Conductivity Logging and Electrical Stratigraphy in a High-Resistivity Aquifer, Boise Hydrogeophysical Research Site", Geophysics, vol. 74, No. 3 (May-Jun. 2009), (2009), pp. E125-E133.

Orange, Arnold et al., "The Feasibility of Reservoir Monitoring Using Time-Lapse Marine CSEM", Geophysics, 74 (2), (2009), pp. F21-F29.

Panissod, Cedric et al., "Recent Developments in Shallow-Depth Electrical and Electrostatic Prospecting Using Mobile Arrays", Geophysics, vol. 63, No. 5 (Sep.-Oct. 1998), (1998), pp. 1542-1550.

Park, Joonsang et al., "CSEM sensitivity study for Sleipner $CO_2$-injection monitoring", Energy Procedia 37, SciVerse ScienceDirect, (2013), pp. 4199-4206.

Petiau, Gilbert "Second Generation of Lead-Lead Chloride Electrodes for Geophysical Applications", Pure and Applied Geophysics, 157, (2000), pp. 357-382.

Salako, O et al., "Potential Applications of Time-lapse Marine CSEM to Reservoir Monitoring", 75th EAGE Conference & Exhibition incorporating SPE EUROPEC, London, UK, Jun. 10-13, 2013, (2013), 5 pgs.

Samson, Etienne M., et al., "Downhole Systems and Methods for Water Source Determination", Samson, Etienne M., et al., "Downhole Systems and Methods for Water Source Determination", U.S. Appl. No. 13/418,455, filed Mar. 13, 2012, 27 pgs.

San Martin, Luis E., et al., "Fiberoptic Systems and Methods for Subsurface EM Field Monitoring", U.S. Appl. No. 13/736,487, filed Jan. 8, 2013, 19 pgs.

Schamper, Cyril et al., "4D CSEM Feasibility Study: A Land Example", SEG Houston 2009 International Exposition and Annual Meeting, (2009), 5 pgs.

Sharp, David P., et al., "Casing Collar Locator with Wireless Telemetry Support", Sharp, David P., et al., "Casing Collar Locator with Wireless Telemetry Support", U.S. Appl. No. 13/426,414, filed Mar. 21, 2012, 30 pgs.

Shima, Hiromasa et al., "Developments of Non-Contact Data Acquisition Techniques in Electrical and Electromagnetic Explorations", Journal of Applied Geophysics, 35, (1996), pp. 167-173.

Shima, Hiromasa et al., "Fast Imaging of Shallow Resistivity Structures Using a Multichannel Capacitive Electrode System", SEG Annual Meeting, Expanded Abstracts, pp. 377-380.

Skinner, Neal G., et al., "Downhole Time Domain Reflectometry with Optical Components", U.S. Appl. No. 13/655,607, filed Oct. 19, 2012, 32 pgs.

Strack, K M., et al., "Integrating Long-Offset Transient Electromagnetics (LOTEM) with Seismics in an Exploration Environment", Geophysical Prospecting, 1996, 44, 997-7017,European Association of Geo-scientists & Engineers, (1996), 21 pgs.

Tabbagh, Alain et al., "Determination of Electrical Properties of the Ground at Shallow Depth With an Electrostatic Quadrupole: Field Trials on Archaeological Sites", Geophysical Prospecting, 41, (1993), pp. 579-597.

Thiel, David V. "On Measuring Electromagnetic Surface Impedance—Discussions with Professor James R. Wait", IEEE Transactions on Antennas and Propogation, vol. 48, No. 10, (2000), pp. 1517-1520.

Timofeeev, V.M. et al., "A New Ground Resistivity Method for Engineering and Environmental Geophysics", Proceedings of the Symposium on the Applications of Geophysics to Engineering and Environmental Problems, (1994), pp. 701-715.

Tondel, Richard et al., "Remote Reservoir Monitoring in Oil Sands: From Feasibility Study to Baseline Datasets", CSEG-CSPG-CWLS GeoConvention, Expanded Abstracts, (2013), 5 pgs.

Tondel, Richard et al., "Reservoir Monitoring in Oil Sands: Developing a Permanent Cross-Well System", SEG Annual Meeting, Expanded Abstracts, (2011), pp. 4077-4081.

Tseng, H.W. et al., "A Borehole-To-Surface Electromagnetic Survey", Geophysics, 63(5), pp. 1565-1572, (1998).

Tumanski, Slawomir "Induction coil sensors—a review", Institute of Physics Publishing, Measurement Science and Technology. 18 (2007) R31-R46, (2007), 17 pgs.

Vohra, S. T. et al., "Fiber-optic ac electric-field sensor based on the electrostrictive effect", Optic Letters, vol. 17, No. 5, Mar. 1, 1992, (Mar. 1, 1992), 3 pgs.

Wirianto, Marwan et al., "A Feasibility Study of Land CSEM Reservoir Monitoring in a Complex 3D Model", Geophysical Journal International, Piers Online, vol. 6, No. 5, (2010), pp. 440-444.

Wright, David et al., "Hydrocarbon detection and monitoring with a multicomponent transient electromagnetic (MTEM) survey", The Leading Edge, 21 (9), (2002), pp. 862-864.

Wu, Hsu-Hsiang et al., "Deep Formation Evaluation Systems and Methods", PCT Appl No. PCT/US2012/071550 filed Dec. 23, 2012,(Dec. 23, 2012), 23 pgs.

Zach, J.J. et al., "Marine CSEM Time-Lapse Repeatability for Hydrocarbon Field Monitoring", Presented at SEG Annual Meeting in Houston, (2009), 5 pgs.

Zhdanov, Michael S. et al., "Feasibility study of electromagnetic monitoring of $CO_2$ sequestration in deep reservoirs", SEG Houston 2013 Annual Meeting, DOI http://dx.doi.org/10.1190/segam2013-0694.1, (2013), pp. 2417-2421.

Zhdanov, Michael S., et al., "3D inversion of towed streamer EM data—A model study of the Harding field and comparison to 3D CSEM inversion", SEG San Antonio 2011 Annual Meeting, (2011), 5 pgs.

Ziolkowski, Anton et al., "Multi-Transient Electromagnetic Repeataibility Experiment Over the North Sea Harding Field", Geophysical Prospecting, 58, (2010), pp. 1159-1176.

Zonge, Kenneth L. et al., "The Effect of Electrode Contact Resistance on Electric Field Measurements", 55th SEG Annual Meeting, Washington D.C., Expanded Abstracts, (1985), 8 pgs.

* cited by examiner

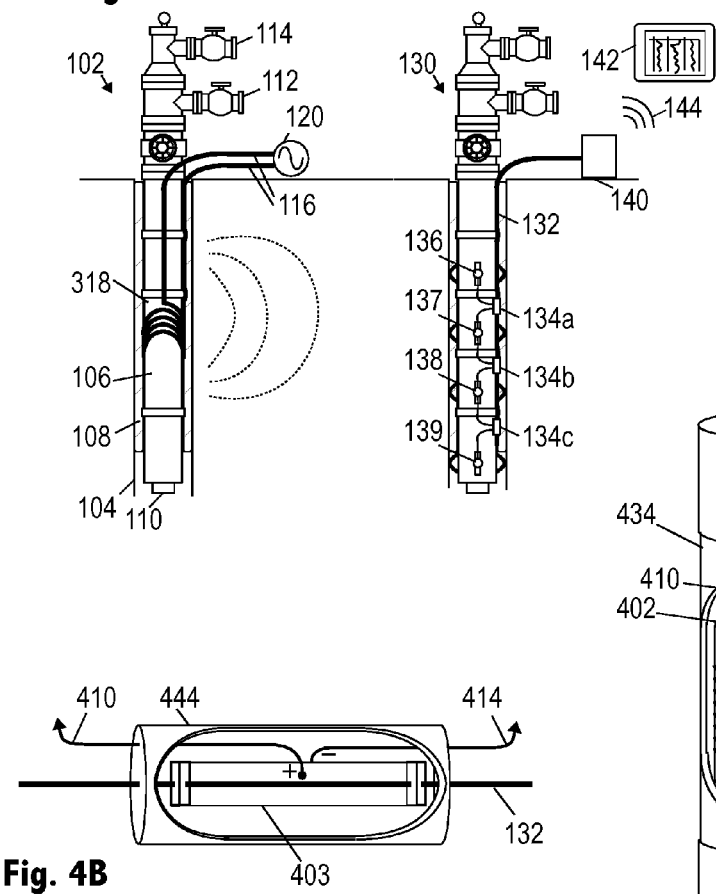
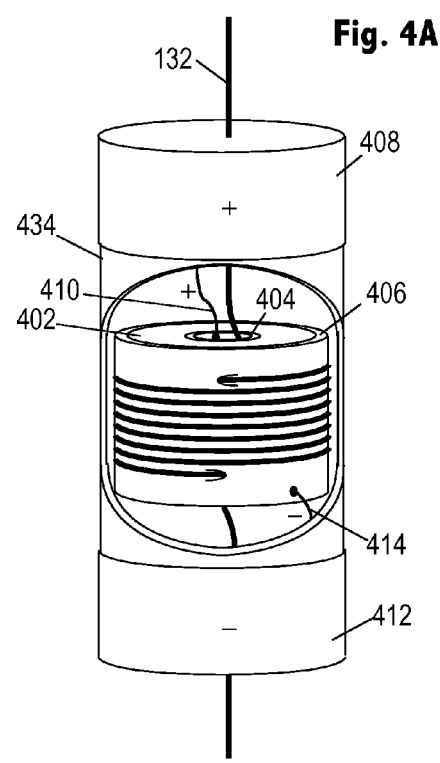
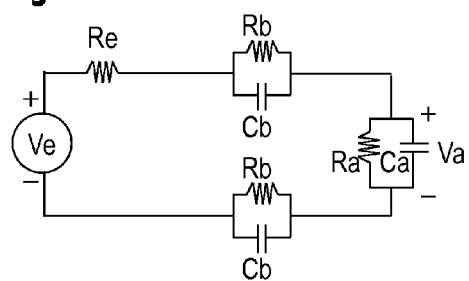

OPTICAL ELECTRIC FIELD SENSORS HAVING PASSIVATED ELECTRODES

BACKGROUND

Oilfield operators are faced with the challenge of maximizing hydrocarbon recovery within a given budget and timeframe. While they perform as much logging and surveying as feasible before and during the drilling and completion of production and, in some cases, injection wells, the information gathering process does not end there. It is desirable for the operators to track the movement of fluids in and around the reservoirs, as this information enables them to adjust the distribution and rates of production among the producing and/or injection wells to avoid premature water breakthroughs and other obstacles to efficient and profitable operation. Moreover, such information gathering further enables the operators to better evaluate treatment and secondary recovery strategies for enhanced hydrocarbon recoveries.

The fluid saturating the formation pore space is often measured in terms of a hydrocarbon fraction and a water fraction. Due to the solubility and mobility of ions in water, the water fraction lends itself to indirect measurement via a determination of formation resistivity. The ability to remotely determine and monitor formation resistivity is of direct relevance to long term reservoir monitoring, particularly for enhanced oil recovery (EOR) operations with water flooding and/or $CO_2$ injection. Hence, a number of systems have been proposed for performing such remote formation resistivity monitoring.

One such proposed system employs "electrical resistivity tomography" or "ERT". Such systems employ galvanic electrodes which suffer from variable and generally degrading contact resistance with the formation due to electrochemical degradation of the electrode, which is further exacerbated by temperature drift and electrochemical noise. In addition to limiting the useful system lifetime, such effects directly impair data quality and survey repeatability. See, e.g., J. Deceuster, O. Kaufmann, and V. Van Camp, 2013, "Automated identification of changes in electrode contact properties for long-term permanent ERT monitoring experiments" Geophysics, vol. 78 (2), E79-E94. There are difficulties associated with ERT on steel casing. See, e.g., P. Bergmann, C. Schmidt-Hattenberger, D. Kiessling, C. Rucker, T. Labitzke, J. Henninges, G. Baumann, and H. Schutt, 2012, "Surface-downhole electrical resistivity tomography applied to monitoring of CO2 storage at Ketzin, Germany" Geophysics, vol. 77 (6), B253-B267. See also R. Tondel, J. Ingham, D. LaBrecque, H. Schutt, D. McCormick, R. Godfrey, J. A. Rivero, S. Dingwall, and A. Williams, 2011, "Reservoir monitoring in oil sands: Developing a permanent cross-well system" Presented at SEG Annual Meeting, San Antonio. Thus, it has been preferred for ERT systems to be deployed on insulated (e.g., fiberglass) casing. However, insulated casing is generally impractical for routine oilfield applications.

Crosswell electromagnetic (EM) tomography systems have been proposed as a non-permanent solution to reservoir monitoring. See, e.g., M. J. Wilt, D. L. Alumbaugh, H. F. Morrison, A. Becker, K. H. Lee, and M. Deszcz-Pan, 1995, "Crosswell electromagnetic tomography: System design considerations and field results" Geophysics, 60 (3), 871-885. The proposed crosswell EM tomography systems involve the wireline deployment of inductive transmitters and receivers in separate wells. However, the wells in a typical oilfield are cased with carbon steel casing, which is both highly conductive and magnetically permeable. Hence, the magnetic fields external of the casing are greatly reduced. Moreover, the casing is typically inhomogeneous, having variations in casing diameter, thickness, permeability, and conductivity, resulting from manufacturing imperfections or from variations in temperature, stress, or corrosion after emplacement. Without precise knowledge of the casing properties, it is difficult to distinguish the casing-induced magnetic field effects from formation variations. See discussion in E. Nichols, 2003, "Permanently emplaced electromagnetic system and method of measuring formation resistivity adjacent to and between wells" U.S. Pat. No. 6,534,986.

Despite the potential of these and other proposed downhole electric-field-sensing based techniques (e.g., galvanic resistivity monitoring, electrical impedance tomography, induced polarization monitoring, controlled-source electromagnetic (CSEM)), their use is restricted by the lack of an adequate solution to the electrochemical degradation issue.

BRIEF DESCRIPTION OF THE DRAWINGS

Accordingly, there are disclosed in the drawings and the following description various electro-optical transducers for electric field sensing with passivated electrodes, along with systems and methods for their use. In the drawings:

FIGS. 1-3 depict various illustrative permanent monitoring systems.

FIG. 4 shows an illustrative optical electrical field sensor.

FIG. 5 is an illustrative equivalent circuit schematic.

Figure 1:
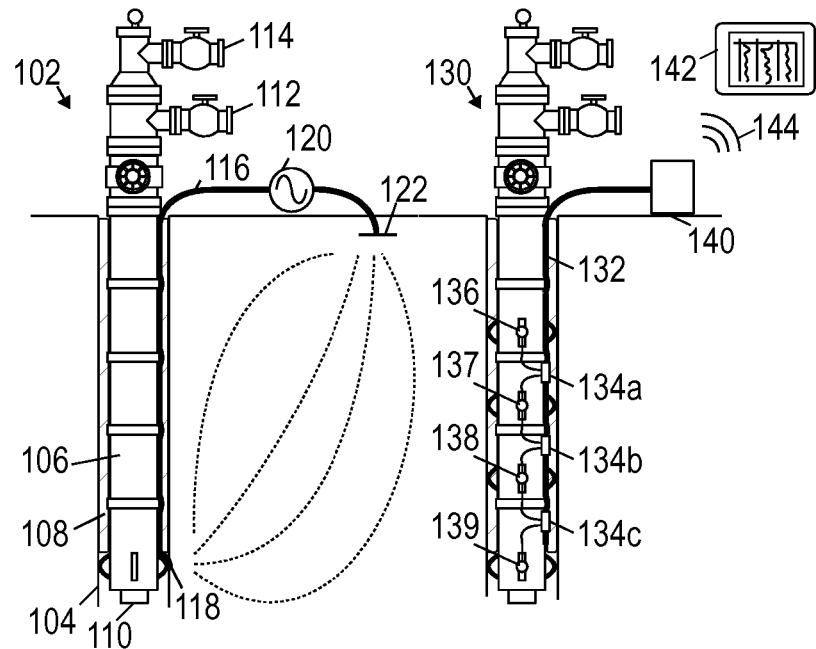

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Certain disclosed device, system, and method embodiments provide permanent electromagnetic (EM) monitoring of the regions around and between wells. Certain disclosed system embodiments provide a casing string positioned within a borehole through the subsurface formations of interest. At least two passivated electrodes are mounted on the casing string to sense electric fields in the formation. Though only capacitively coupled to the formation, the passivated electrodes nevertheless provide a potential difference to an electro-optical transducer, which in turn modifies a property of the light passing along an optical fiber attached to the casing string. An interface unit senses the modified property to derive a measure of the electric field between each pair of passivated electrodes. Such measurements can be used to monitor fluid fronts within a reservoir and around the borehole.

The passivated electrodes have a contact surface that is conductive but for one or more layers of non-reactive (and thus electrically insulating) materials. Illustrative materials include oxides of the metal forming the bulk of the electrodes, such as aluminum oxide and titanium oxide. Other suitable materials include polymers and ceramics, but the layers are preferably kept very thin to maximize the coupling capacitance with the formation.

Certain disclosed sensor embodiments employ electro-optical transducers that modify the tension in the optical fiber, thereby modifying the phase of light passing through the transducer. Other sensor embodiments alter the width of a gap in the optical fiber to modify the spectrum of light transmitted through or reflected from the gap. Other transducer embodiments are known and can be used, so long as the equivalent capacitance of the electro-optical transducer is significantly lower than a coupling capacitance of the passivated electrodes. Alternatively, or in addition, the equivalent resistance of the electro-optical transducer may be significantly higher than a coupling resistance of the passivated electrodes.

To provide some context for the disclosure, FIG. 1 shows an illustrative permanent EM monitoring system for a reservoir, with a first well 102 having a casing string 104 set within a borehole 106 and secured in place by a cement sheath 108. Inside the casing string 106, a production tubing string 110 defines an annular flow path (between the walls of the casing string and the production tubing string) and an inner flow path (along the bore of the production tubing string). Wellhead valves 112 and 114 provide fluid communication with the bottom-hole region via the annular and inner flow paths, respectively. Well 102 may function as a production well, an injection well, or simply as a monitoring well.

Well 102 includes an armored cable 116 strapped to the outside of the casing string 106 to provide an insulated electrical connection to a downhole electrode 118. A current source 120 drives a current between the downhole electrode 118 and one or more return electrodes 122 located at a distance from the downhole electrode and the well 102. To best emulate the behavior of an electrical monopole, additional, distributed return electrodes may be employed. (In some systems the return electrodes 122 may include the casing string in another well.) As it is desired to provide a distributed current flow through the formation, the downhole electrode 118 is preferably insulated from the casing string 106 and the cement 108 may be formulated to create a sheath that is relatively nonconductive (compared to the formation). To further promote current flow into the formation, a centralizer fin, arm, or spring may optionally be provided to maintain contact or at least proximity between the electrode 118 and the borehole wall.

In the same or in a separate well 130, another cable 132 is strapped to the outside of the casing string. It includes an array of electro-optical transducers 134a, 134b, 134c, which can be interrogated via an optical fiber in cable 132. Electro-optical transducers 134 are each coupled to a pair of separated sensing electrodes. In FIG. 1, electro-optical transducer 134a is coupled between sensing electrodes 136 and 137, electro-optical transducer 134b is coupled between sensing electrodes 137 and 138, and electro-optical transducer 134c is coupled between sensing electrodes 138 and 139. Such sharing of sensing electrodes between electro-optical transducers is optional, and in at least some alternative embodiments, each electro-optical transducer is coupled to a dedicated pair of sensing electrodes. The electrode spacing is a design parameter that can be adjusted to the desired application. Larger spacings provide enhanced volume of investigation at the cost of reduced spatial resolution.

As with downhole electrode 118, the sensing electrodes 136-139 are preferably insulated from the casing string and may be held in contact or proximity with the borehole wall by a centralizer element or other mechanism. Such insulation can be provided by making the casing (at least in the proximity of the sensing electrode) from a non-conductive material such as fiberglass. Alternatively, a layer of such non-conductive material may surround the casing in the vicinity of the sensing electrode and/or serve as an insulating substrate for the sensing electrode.

Electric fields translate into potential differences between the sensing electrodes. The electro-optical transducers 134 employ this potential difference to modify some property of the light that propagates along cable 132. An interface unit 140 includes a light source that transmits light along the optical cable, and a receiver that that receives the optical signal from the electro-optical transducers 134, which signal is correlated to the corresponding electric field measurements. Interface unit 140 further couples to a wired or wireless network 144 to communicate the measurement information to a processing unit 142 for further analysis and display to a user.

Processing unit 142 may be a computer in tablet, notebook, laptop, or portable form, a desktop computer, a server or virtual computer on a network, a mobile phone, or some combination of like elements that couple software-configured processing capacity to a user interface. The processing includes at least compiling a time series of measurements to enable monitoring of the time evolution, but may further include the use of an earth model that takes into account the relative positions and configurations of the transducer modules and inverts the measurements to obtain one or more attributes of the earth model. Those attributes may include a resistivity distribution and an estimated water saturation distribution.

The processing unit 142 may further enable the user to adjust the configuration of the system, modifying such parameters as firing rate of the transmitters, firing sequence of the transmitters, transmit amplitudes, transmit waveforms, transmit frequencies, receive filters, and demodulation techniques. In some contemplated system embodiments, the computer further enables the user to adjust injection and/or production rates to optimize production from the reservoir.

Figure 2:
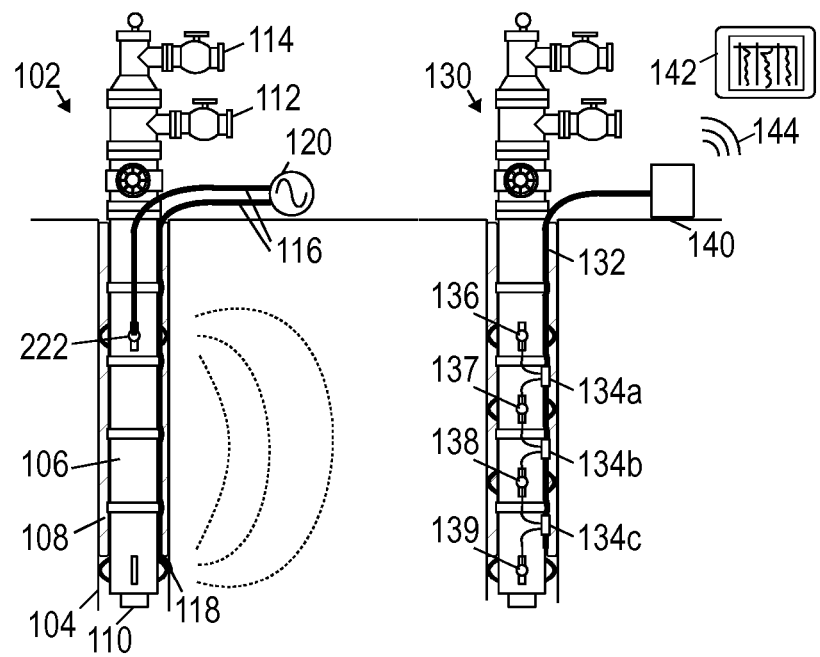

FIG. 2 shows a related EM monitoring system configuration with a second downhole electrode 222 spatially separated from the first downhole electrode 118. Current source 120 is coupled to the downhole electrodes 118, 222 by cable 116 to drive a current between the downhole electrodes. Both electrodes are preferably in contact or proximity to the borehole wall and insulated from the casing 106, so as to promote current flow through the formation. The two electrode configuration enables the transmitter to emulate an electric dipole. A similar current distribution pattern may be achieved using a toroid around the casing string in place of the pair of downhole electrodes. In either case, a sensing array may be located in the same or a nearby well to obtain responsive electric field measurements.

FIG. 3 shows yet another related EM monitoring system configuration with a tilted coil antenna 318 positioned around the casing 106 instead of one or more downhole electrodes. The windings of the coil antenna 318 may be tilted or non-tilted (co-axial to the casing), depending on which dipole orientation is desired for the transmitter. Current source 120 may be coupled to the coil antenna 318 by cable 116 to drive the coil antenna as a magnetic dipole. Additional coil antennas tilted at different orientations may be included to enable multi-component signal transmission. A sensing array may be located in the same or a separate well to obtain responsive electric field measurements.

Still other EM monitoring system embodiments omit the active ("controlled") sources, relying instead on natural EM sources such as telluric currents and spontaneous potentials. Additional sensors may be employed for characterizing the natural EM source to aid in the inversion process, or the system may rely on interferometric or virtual source techniques set forth in the literature.

Regardless of the source for the EM fields around the borehole(s), the electric field between two sensing electrodes can be measured by their potential difference. However, as explained in the background section, the use of galvanic electrodes leads to electrochemical effects that may obscure the desired measurement signals. Where the formation fluids contact the solid metal (or metal/metal-salt such as Ag/AgCl), a double-layer contact region forms to provide for the transition from electronic conduction in the metal to ionic conduction in the formation. The electrochemistry of this double-layer is complex, but invariably results in a non-trivial resistance to current flow. Moreover, the impedance will vary with time, temperature, and ionic species concentrations.

Accordingly, sensing electrodes 136-139 are preferably "passivated", i.e., purposefully coated or chemically treated to reduce their reactivity with formation fluids. Such treatments also create an electrically-insulating layer that prevents electron flow between the electrode and the formation. However, capacitive coupling can still be achieved, particularly if the passivation layer is kept very thin and/or formed from a material having a high dielectric constant. Preferably, such layers are extremely robust and/or self-healing to minimize the effects of any scrapes or scratches. Some embodiments may employ multiple barrier layers to, e.g., incorporate multiple methods of reducing electrochemical reactions between the electrode plates and the formation fluids.

The contact area of the electrode may also be increased to enhance the capacitive coupling, e.g., with fins, pins, ridges, projections, surface textures, and porous or expanded mesh materials. Conformal shapes (e.g., to match the borehole wall) or deformable materials may be employed to further improve coupling between the electrode and formation.

Various approaches are available for creating a suitable passivation layer. For example, the electrodes may be coated with a non-reactive material using a vapor coating technique. Alternatively the electrodes may be formed or coated with a material that readily forms a protective oxide layer, e.g., aluminum, tantalum, and/or titanium. Elemental aluminum, for example, oxides in air to form a 4 nm thick passivation layer of electrically insulating aluminum oxide, and an anodizing process may be employed to enhance this layer. Advantageously, such layers are self-healing, reforming after being scratched or scraped away. Titanium oxide may be particularly well suited for long term downhole use. Corrosive treatments may alternatively or additionally be used to further accelerate the formation of such passivation layers.

As active sensing of the potential difference between capacitively coupled, passivated electrodes can be susceptible to drift and electromagnetic interference, electro-optical transducers 134 preferably employ a passive architecture such as, e.g., a piezoelectric element. FIG. 4A shows an illustrative electro-optical transducer 434 having a piezoelectric tube 402 with opposing conductive surfaces 404, 406 (on the inside and outside surfaces of the tube). One passivated electrode 408 is electrically coupled to contact surface 404 by a conductive lead 410, and a second passivated electrode 412 is coupled to the other conductive surface 406 by a conductive lead 414. The potential difference between passivated electrodes 408, 412, is communicated to the opposing surfaces 404, 406, to impose a corresponding electric field across the piezoelectric tube 402. The tube's shape changes in response to variations in the electric field, expanding or contracting radially and thereby altering the strain in the optical fiber of cable 132, creating a longer or shorter optical path for light passing through the portion of the cable wound around the tube 402.

FIG. 4B shows an alternative transducer configuration. An illustrative electro-optical transducer 444 includes a piezoelectric bar 403 with opposing conductive surfaces to which conductive leads 410, 414 are electrically coupled. The conductive leads 410, 414, take the form of wires that attach to external sensing electrodes, such as passivated electrodes 136-139 of FIGS. 1-3. Where the sensing electrode design incorporates guard electrodes or other field-shaping elements, each such element having a formation current-coupling function may be passivated in the same fashion as the main sensing electrode to preserve the consistent operation of the electrode design.

The bar 403 flexes in response to an applied field, altering the strain between the two attachment point on cable 132 and thereby altering the optical path between these point in accordance with the electric field between the passivated electrodes. The electro-optical transducers 134, 434, 444, may be designed to operate in a region where their response is fairly linear.

Various suitable electrostrictive transducer materials and configurations are disclosed in the literature and available commercially, including configurations that employ multiple stacked layers of piezoelectric material to provide an enhanced dimensional response to the applied signal. Electro-optic lithium niobate phase modulators are specifically contemplated, as are ferroelectric materials that can be used in conjunction with optical fiber.

FIG. 5 shows an equivalent circuit for the sensors. The electro-optical transducers 134, 434, 444, are modeled as a capacitance Ca in parallel with a resistance Ra, each of the electrodes is modeled as a capacitance Cb in parallel with a resistance Rb, and the formation between the passivated electrodes is modeled as a voltage source Ve in parallel with a resistance Re. The transducer voltage Va most closely approximates the source voltage Ve when the transducer impedance (Za=Ra−j/wCa) substantially exceeds the sum of the other impedances in the system. At low frequencies, it is sufficient to have Ca be much smaller than Cb, whereas at high frequencies it is desirable to have Ra be much larger than Re+2Rb. In this instance, "much smaller" or "much larger" means a factor of approximately 10 or more.

The demarcation between high and low frequencies can be taken as f=1/(2 πCa(Re+2Rb+Ra)). Taking into account the expected earth impedance (for typical resistivities of 1-1000 Ωm, typical earth resistances Re might be $10-10^5$ Ω), the system parameter values may be designed to elevate the demarcation frequency and thereby make the transducer response largely independent of the earth impedance Re and the electrodes' contact resistance Rb. For example, a transducer capacitance Ca on the order of pico-Farads should be achievable, making the demarcation frequency at least hundreds of Hertz even with various resistances being on the order of mega-ohms. Alternatively, the transducer resistance Ra may be made large enough to make the dependence on earth impedance Re and contact resistance Rb relatively negligible.

Taking as a representative electrode a square aluminum plate that is 5 cm on each side, with a 4 nm oxide barrier, the electrode capacitance Cb would be about 5 µF and the contact resistance would be greater than 10 kΩ. A lithium niobate phase modulator could have a capacitance Ca as low as 20 pF with an activation voltage of about 1 µV. An internal resistance of at least 1 MΩ is expected, enabling more than 99.9% of the earth's potential to be coupled to the lithium niobate phase modulator. In turn, this implies a minimum detectable earth potential of approximately 1 µV, which for electrodes spaced 0.25 m apart implies a minimum detectable electric field of approximately 4 µV/m. (Such a spacing might be expected for the integrated sensor package of FIG. 4A.) For passivated sensing electrodes spaced 10 m apart (e.g., on adjacent casing connectors), a minimum detectable electric field of approximately 0.1 µV/m may be expected. For comparison, available studies of waterflood monitoring models suggest that minimum sensitivities of 10 µV/m are needed for adequate detection of a waterflood front at 15 m from a well having the sensors and an electric monopole or dipole source driven with 1 A of current.

It should be noted that the equivalent circuit of FIG. 5 is an approximation. Additional parasitic effects include a series contact resistance between the passivated electrodes and the formation and the series resistance and inductance of the electrode leads. In cases where such parasitic effects cannot be entirely neglected, the system design may be tailored to compensate or mitigate such effects. For example, lead inductance can be compensated with additional electrode capacitance or discrete capacitive elements, and contact impedance effects may be mitigated through minimization of current flow via increased resistance values elsewhere and/or through the use of current transformers. Where impedance matching circuitry or other electrical circuit components are desired, such elements may be integrated into the sensing transducer unit, which itself may be integrated into the sensing cable to simplify deployment.

Figure 6:
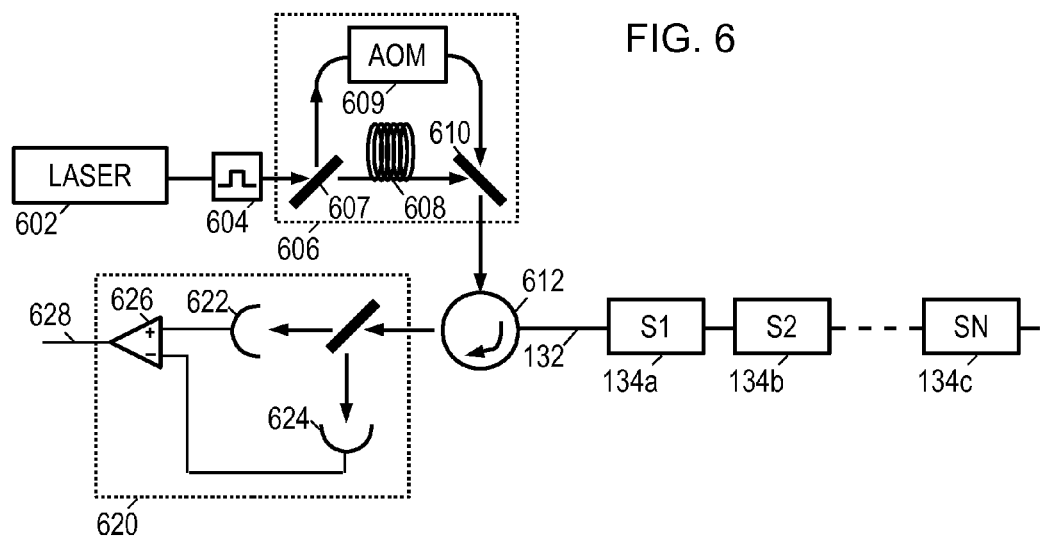
FIG. 6 shows an illustrative optical sensor interrogation system.

FIG. 6 shows an illustrative interrogation system for detecting the effects of the various electro-optical transducers 134a-134c along cable 132. The cable 132 is coupled to a circulator 612 in the interface unit 140 (FIG. 1) to receive a sequence of interrogation light pulses and to provide a return signal. The interface unit 140 generates the interrogation light pulses using a continuous laser 602 and a gate 604 to form a sequence of pulses with a spacing that exceeds the two-way travel time between the first and last optical sensing transducers 134a, 134c. (Alternative pulse generator configurations may employ a semiconductor optical amplifier, or "SOA".)

A compensator 606 includes a first beam splitter 607 to direct each light pulse along two optical paths and a second beam splitter 610 to recombine the light from the two paths. As the optical paths have different propagation times, each pulse is converted into a double pulse. One of the pulses is slightly shifted in frequency due to the presence of an acousto-optic modulator 609 on one path. The other optical path provides an optical delay 608 relative to the first path to create the double-pulse. The total width of the double pulse should not exceed the minimum two-way travel time between adjacent transducers.

Light pulses propagating along the cable 132 encounter scattering imperfections in the optical fiber, causing a small fraction of the light to return from each point along the fiber to the circulator 612 with a delay that corresponds to the position of the scattering imperfections at that point. The light received at the circulator is a combination of the light scattered from the two pulses in the pulse pair, which light interferes constructively or destructively depending on its phase difference. A receiver 620 measures this interfering light, producing a signal 628 that represents the phase difference. Signal 628 may be generated using a 180° power combiner 626 that differences the signals from two photodetectors 622, 624 which are sensing the transmitted and reflected light components from a beam splitter.

Aside from a linearly-varying phase offset provided by the acousto-optic modulator 609, the phase difference associated with the segment of optical fiber between the two scattering points associated with the pulse pair is a function of the strain in that fiber segment. By dividing the measurement signal into windows for each segment and tracking the phase from each window as a function of time, the interface unit can monitor the strain as a function of time for each segment. (Coherent demodulation is used to remove the varying phase offset introduced by the acousto-optic modulator). For those segments including a transducer, the strain measurement represents the electric field between the associated passivated electrodes.

We note here that the strain in other segments may also be tracked to provide distributed monitoring of other parameters affecting the strain, e.g., pressure, temperature. Additional discrete transducers may also be included for sensing other downhole parameters, e.g., acoustic signals, chemical species concentrations, magnetic fields, etc. Although the illustrative systems show only three transducers, in principle the only limits on the number of transducers is imposed by the attenuation of light propagating along the fiber. Certain contemplated embodiments include hundreds of sensing transducers on a given optical fiber.

The multiplexing scheme employed by the embodiment of FIG. 6 is known as time-division multiplexing (TDM). TDM is just one example of various known multiplexing schemes that enable multiple sensors to share a given optical fiber. Other examples include wavelength-division multiplexing (WDM) and spatial mode multiplexing. Each of these is contemplated for use in conjunction with the systems and methods disclosed herein.

Figure 7:
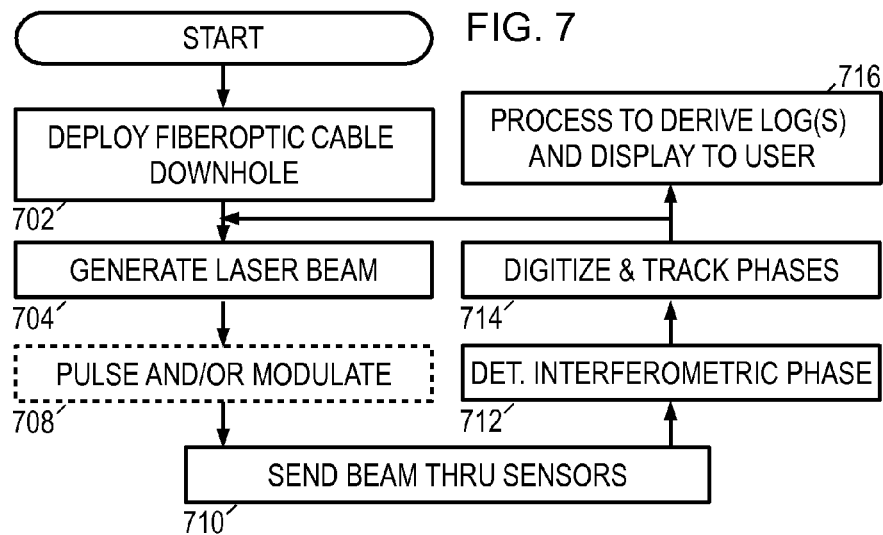
FIG. 7 is a flow chart of an illustrative permanent monitoring method.

FIG. 7 is a flow diagram of an illustrative permanent EM monitoring method. The method begins in block 702 with a crew deploying a sensing cable downhole. In at least some embodiments, the cable is strapped to a casing string as the casing string is assembled and lowered into a borehole before being cemented in place. The crew may further complete the well, performing any needed perforation, treatment, equipping, and conditioning operations to optimize production. The well may alternatively be an injection well or a "dry well" created solely for monitoring.

Alternative deployments are also contemplated, including integration into a wired drillstring for logging while drilling, and further including deployment in a wireline sonde. The transducers are coupled to optical fiber for interrogation, though the optical fiber may be part of a cable that also transports electrical power for transmitters and may further provide pathways for digital telemetry. The optical fiber is attached to an interface unit for interrogation.

In block 704, interface unit generates a laser beam that, in block 708, may be optionally pulsed or modulated to enable multiplexing of responses from multiple transducers in the return signal. In block 710 the one or more sensing transducers modify the light, e.g., adjusting the phase in accordance with the electric field between the passivated electrodes. In block 712, the interface unit measures the modified light, preferably using an interferometric phase measurement. In block 714, the interface unit digitizes the measurement signal and associates the measurements with the various transducers. The interface unit repeats blocks 704-714 to track the measurements as a function of time. In block 716, the measurements are processed to derive logs of the electric fields measured by each transducer or related measurements such as formation impedance, fluid front distance, etc., which are then displayed to a user to enable long term monitoring of the reservoir status. Block 716 may be performed by a separate processing unit coupled to the interface unit.

As disclosed herein, the system has low power requirements, making it compliant with various oilfield-related electrical standards including the intelligent well interface standard (IWIS) and particularly suitable for offshore well environments having limited available power from subsea installations. Some disclosed sensing array embodiments require no downhole power consumption at all. In at least some embodiments, the transmitters may be located downhole and powered from batteries, downhole turbines, or other integrated power sources. The system is also suitable for use in acidic or basic high pressure (e.g., 35,000 psi) and high temperature (e.g., >260° C.) environments and can tolerate continuous vibration over an extended period.

Any suitable antenna configuration may be used including one or more electric monopoles, electric dipoles, magnetic dipoles, and combinations thereof. Typically configurations using multiple antennas would locate the various antennas at different locations, though some embodiments may employ multiple collocated dipole antennas for multi-component field measurements. As mentioned previously, some system embodiments may omit the transmit antennas in favor of relying on natural EM sources such as telluric currents or spontaneous potentials. Passivated electrode pairs too would generally be located at different positions, though some embodiments may employ substantially collocated electrode pairs with separations along different axes to enable multi-component field measurements.

Though the illustrated system configurations employ a separate, single monitoring well for the sensing array, in practice multiple such wells may be used. In addition, or alternatively, the sensing array may be positioned in the well having the transmit antenna(s).

In some alternative system embodiments, the electrostrictive elements of the above-disclosed transducers may be replaced with a light-emitting diode (LED) that is powered by current from the capacitively coupled electrodes. Multiple such transducers can be coupled to a single optical path if each transducer is configured to emit a different wavelength. The interface unit would employ wavelength division demultiplexing to separate the signals associated with each transducer.

Numerous variations and modifications will become apparent to those skilled in the art once the above disclosure is fully appreciated. For example, the figures show system configurations suitable for reservoir monitoring (particularly in response to enhanced oil recovery operations or steam assisted gravity drainage), but they are also readily usable for treatment operations, cementing operations, and $CO_2$ or wastewater sequestration monitoring. Though the foregoing disclosure focuses on permanent monitoring, the disclosed techniques can also be readily adapted to wireline and logging-while-drilling applications. The ensuing claims are intended to cover such variations where applicable.

What is claimed is:

1. A permanent electromagnetic (EM) monitoring system that comprises:
   a casing string positioned inside a borehole penetrating a formation;
   an optical fiber attached to the casing string;
   at least two passivated electrodes on the casing string to provide a potential difference in response to an electric field in said formation;
   an electro-optical transducer coupled to the optical fiber to modify a property of light conveyed by the optical fiber in accordance with the potential difference, wherein the electro-optical transducer includes an electrostrictive element that receives the potential difference and responsively alters a tension in said fiber to modify a phase of said light; and
   an interface unit that senses said property of said light to measure the electric field.

2. The system of claim 1, wherein the electro-optical transducer is one of multiple optical transducers coupled to the optical fiber to modify said light in accordance with a potential difference from a respective pair of passivated electrodes.

3. The system of claim 2, wherein the interface unit transmits optical light along the optical fiber and monitors electro-optical-transducer induced phase changes to measure the electric field between pairs of passivated electrodes.

4. The system of claim 3, wherein the interface unit performs interferometric phase monitoring.

5. The system of claim 1, wherein the electro-optical transducer has an equivalent capacitance that is no more than a tenth of a coupling capacitance of each passivated electrode.

6. The system of claim 1, wherein the electro-optical transducer has an equivalent resistance that is at least a factor of ten larger than a coupling resistance of each passivated electrode.

7. The system of claim 1, wherein each passivated electrode has a contact surface coated with an electrically insulating layer.

8. The system of claim 7, wherein the contact surface comprises a metal and the layer comprises an oxide of said metal.

9. A permanent EM monitoring method that comprises:
   running a casing string into a borehole, the casing string including an array of electro-optical transducers coupled to an optical fiber, each electro-optical transducer modifying a property of light conveyed by the optical fiber in accordance with an electrical field sensed by two passivated electrodes capacitively coupled to a formation, wherein the electro-optical transducer includes an electrostrictive element that receives the potential difference and responsively alters a tension in said fiber to modify a phase of said light;
   coupling the optical fiber to an interface unit;
   interrogating the array of electro-optical transducers to measure the electrical fields.

10. The method of claim 9, further comprising cementing the casing string in place.

11. The method of claim 9, further comprising: generating said electrical fields with a controlled source.

12. The method of claim 9, further comprising inverting the electrical fields to monitor at least one parameter of the subsurface formation over time.

13. The method of claim 12, wherein said at least one parameter comprises a fluid saturation.

14. A permanent optical electric field sensor that comprises:
   an optical fiber;
   two leads that electrically connect to two passivated electrodes that provide a capacitive coupling to a formation; and an electro-optical transducer that modifies a property of light conveyed by the optical fiber in accordance with a potential difference between the two leads, wherein the electro-optical transducer includes an electrostrictive element that receives the potential difference and responsively alters a tension in said fiber to modify a phase of said light.

15. The sensor of claim 14, wherein the electro-optical transducer has an equivalent capacitance that is no more than a tenth of a coupling capacitance of each passivated electrode, and wherein each passivated electrode has a coupling resistance that is no more than a tenth of an equivalent resistance of the optical transducer.

16. The sensor of claim 14, wherein each passivated electrode has a contact surface coated with an electrically insulating layer.

* * * * *